(12) United States Patent
Andrada et al.

(10) Patent No.: US 9,397,848 B2
(45) Date of Patent: Jul. 19, 2016

(54) INTERFACE FOR ACCESSING EVOLVED MULTIMEDIA BROADCAST MULTICAST SERVICES (EMBMS) MIDDLEWARE SERVICES

(71) Applicant: Cellco Partnership, Basking Ridge, NJ (US)

(72) Inventors: Mauricio Pati Caldeira de Andrada, South Plainfield, NJ (US); John Gu, Rockaway, NJ (US); Robert Kaphan, Bloomsbury, NJ (US); Danny C. Lui, Belle Mead, NJ (US)

(73) Assignee: Cellco Partnership, Basking Ridge, NJ (US)

(*) Notice: Subject to any disclaimer, the term of this patent is extended or adjusted under 35 U.S.C. 154(b) by 118 days.

(21) Appl. No.: 14/220,612

(22) Filed: Mar. 20, 2014

(65) Prior Publication Data

US 2015/0270979 A1 Sep. 24, 2015

(51) Int. Cl.
*H04L 12/18* (2006.01)
*H04L 12/58* (2006.01)
*H04W 76/00* (2009.01)
*H04W 4/06* (2009.01)

(52) U.S. Cl.
CPC .............. *H04L 12/189* (2013.01); *H04L 51/38* (2013.01); *H04W 4/06* (2013.01); *H04W 76/002* (2013.01)

(58) Field of Classification Search
None
See application file for complete search history.

(56) References Cited

U.S. PATENT DOCUMENTS

| | | | | |
|---|---|---|---|---|
| 2005/0169202 | A1* | 8/2005 | Ratasuk | H04W 52/327 370/312 |
| 2009/0175183 | A1* | 7/2009 | Mochizuki | H04W 36/18 370/252 |
| 2010/0110959 | A1* | 5/2010 | Shimobayashi | H04H 20/42 370/312 |
| 2013/0040691 | A1* | 2/2013 | Ode | H04B 7/022 455/524 |
| 2014/0241229 | A1* | 8/2014 | Bertorelle | H04W 4/06 370/312 |
| 2014/0372624 | A1* | 12/2014 | Wang | H04L 65/60 709/231 |

* cited by examiner

*Primary Examiner* — Yemane Mesfin
*Assistant Examiner* — Peter Chen

(57) ABSTRACT

A device provides, to another device, a start request for an evolved multimedia broadcast multicast services (eMBMS) session, and receives eMBMS session traffic from the other device based on the start request. The device determines track information from the eMBMS session traffic, and decodes the eMBMS session traffic into a format understood by the device. The device determines quality information associated with the eMBMS session traffic, and presents, for display, the decoded eMBMS session traffic, the track information, and the quality information associated with the eMBMS session traffic.

20 Claims, 13 Drawing Sheets

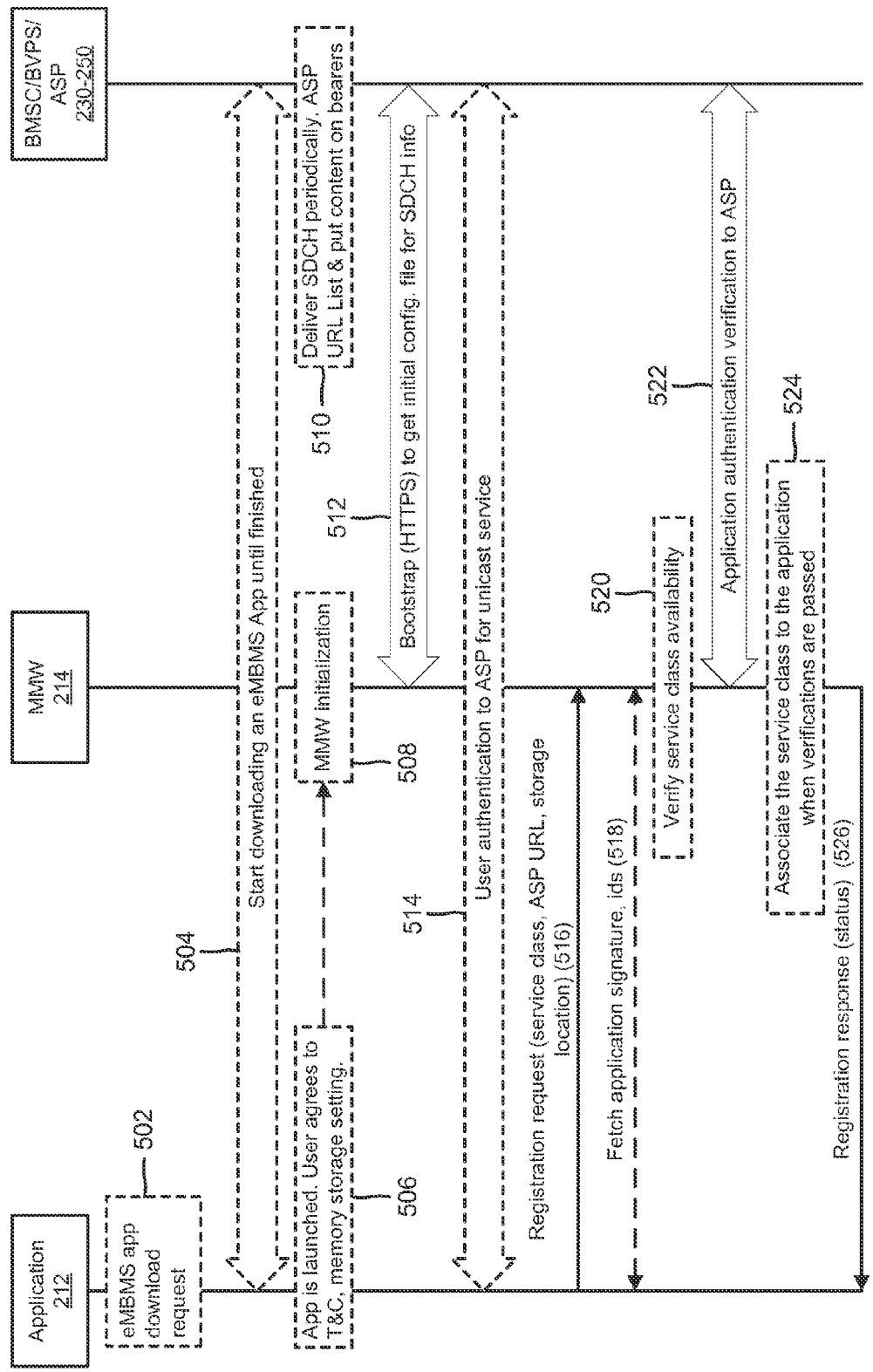

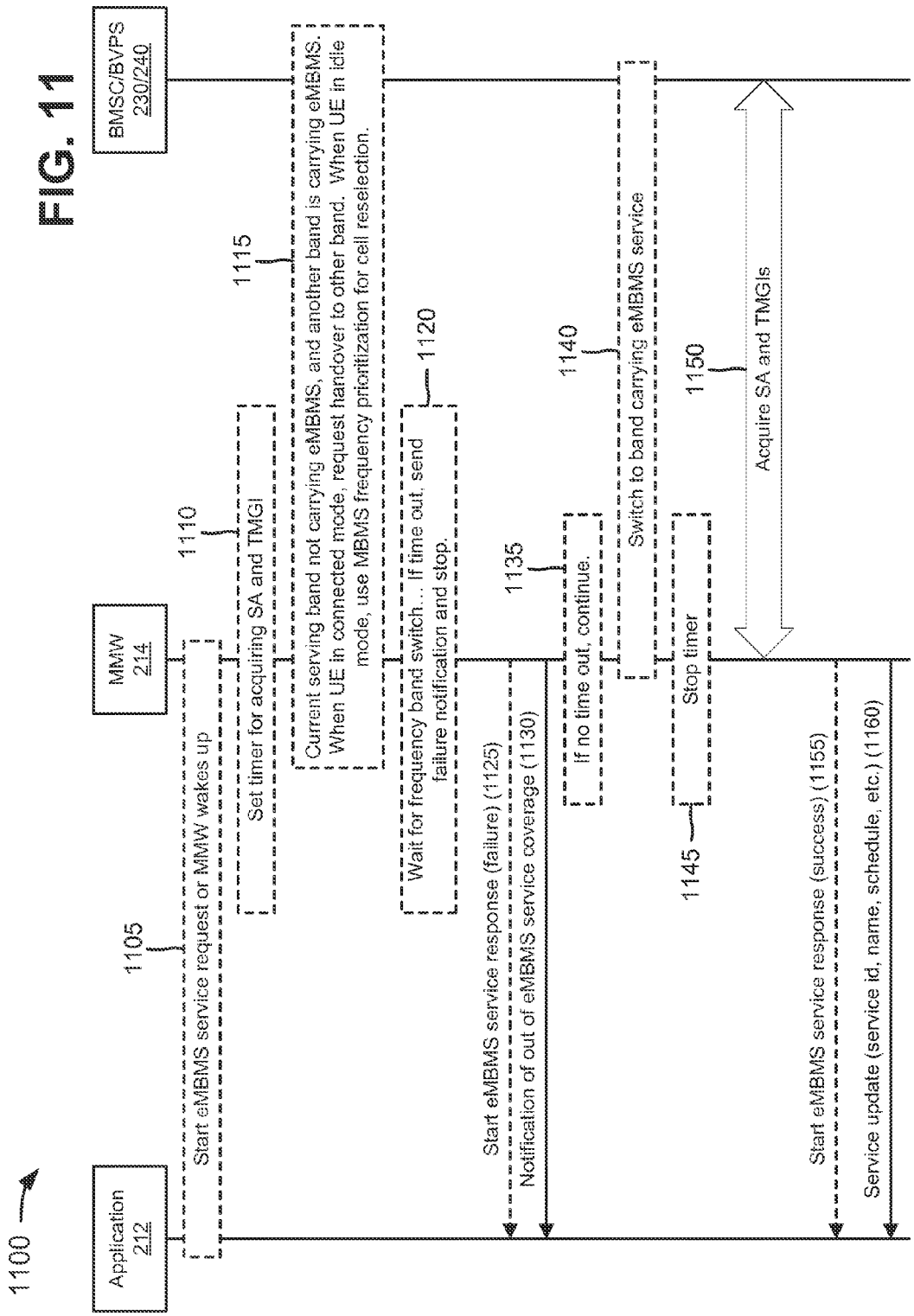

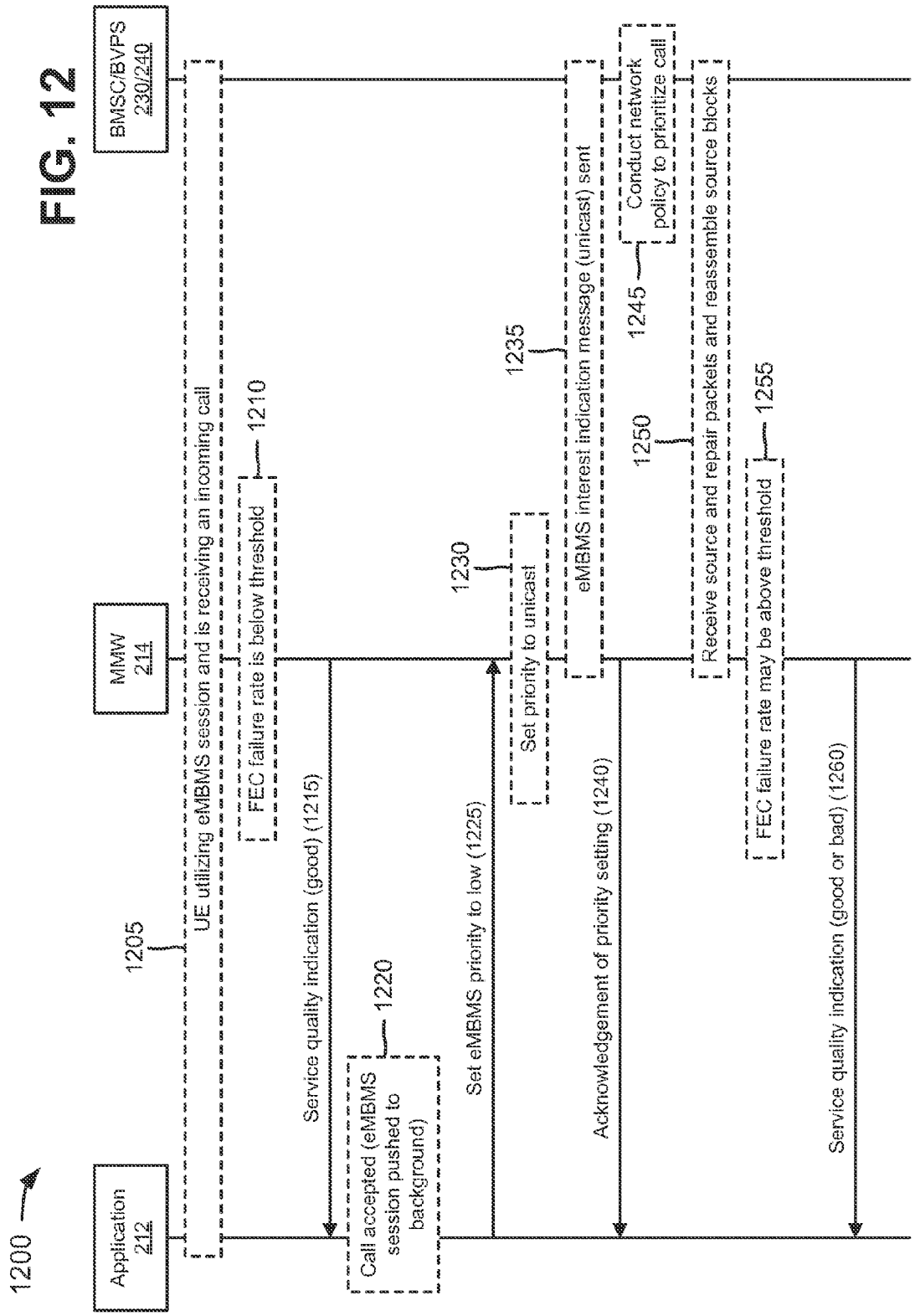

INTERFACE FOR ACCESSING EVOLVED MULTIMEDIA BROADCAST MULTICAST SERVICES (EMBMS) MIDDLEWARE SERVICES

BACKGROUND

Evolved multimedia broadcast multicast services (eMBMS) include a point-to-multipoint (PMP) interface specification for existing and upcoming Third Generation Partnership Project (3GPP) cellular networks. eMBMS are designed to provide efficient delivery of broadcast and multicast services, both within a cell as well as within a core network. For broadcast transmission across multiple cells, eMBMS defines transmission via single-frequency network configurations. Applications for eMBMS include mobile content (e.g., television (TV) and radio) broadcasting on user equipment (UE), as well as file delivery and emergency alerts for UEs.

BRIEF DESCRIPTION OF THE DRAWINGS

FIGS. 5A and 5B are diagrams of an example call flow relating to the example process shown in FIG. 4;

FIG. 11 is a diagram of an example call flow relating to single band eMBMS for a UE; and FIG. 12 is a diagram of an example call flow relating to eMBMS priority for a UE.

DETAILED DESCRIPTION OF PREFERRED EMBODIMENTS

The following detailed description refers to the accompanying drawings. The same reference numbers in different drawings may identify the same or similar elements.

Unique users accessing popular content (e.g., via UE), such as video and software updates, may consume such content via unicast and may create multiple instances of the same content in a network. This may not be desirable due to network resources being inefficiently allocated for point-to-point traffic. eMBMS may broadcast such content on a controlled channel, which may permit users to access the content with no difference in user experience while conserving network resources via delivery over eMBMS. This may be achieved by configuring an access network to form an eMBMS single frequency network (MBSFN), where multiple cells may transmit the same information with known network parameters, schedule, and service area for content delivery. A UE may utilize a multicast middleware (MMW) client for delivering eMBMS to the UE. However, the MMW client may require an interface to applications of the UE so that the applications may utilize eMBMS.

Figure 1:
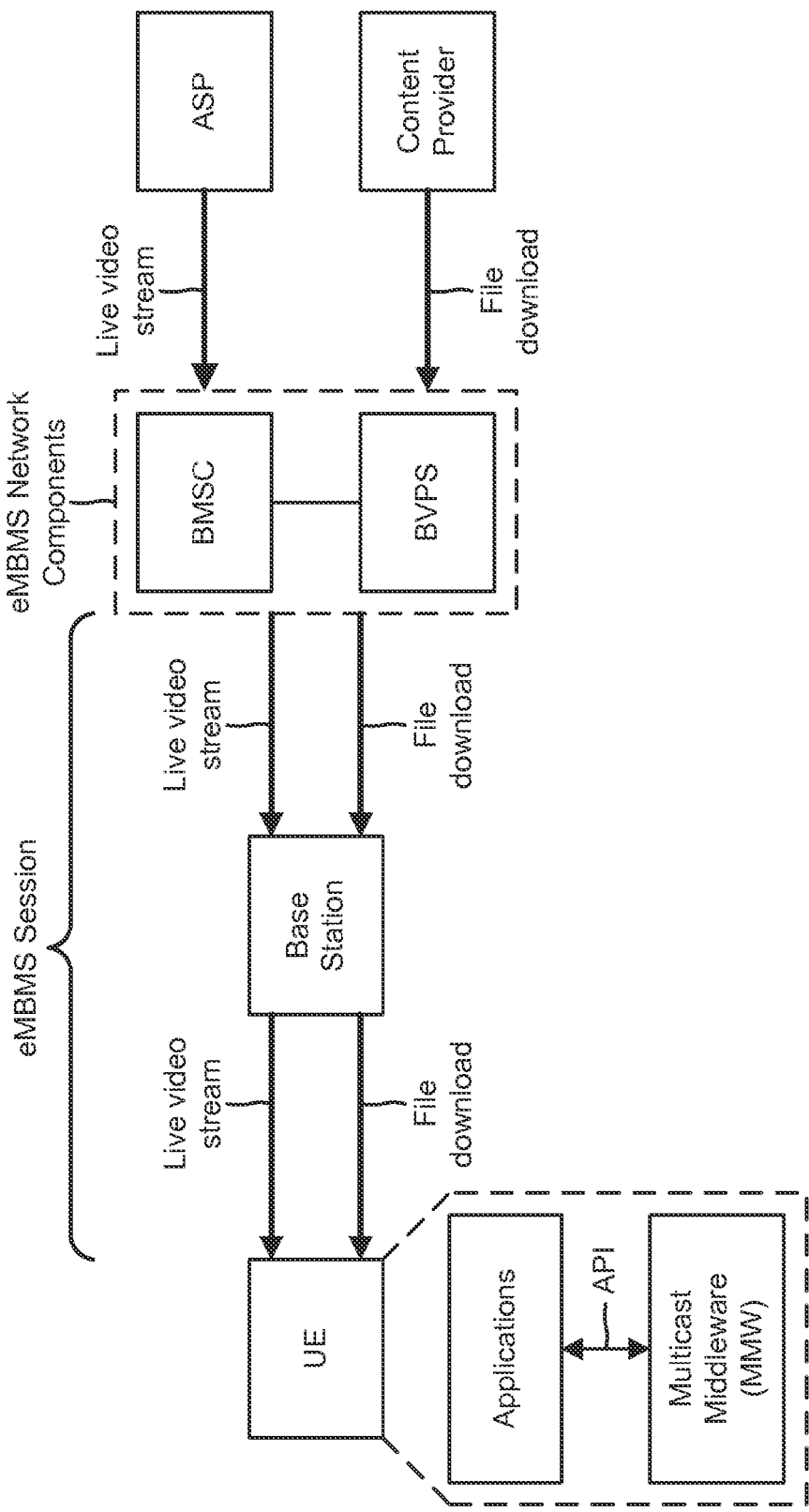
FIG. 1 is a diagram of an overview of an example implementation described herein.

FIG. 1 is a diagram of an overview of an example implementation 100 described herein. In example implementation 100, assume that a UE connects to an access network via a base station, and that the base station connects to eMBMS network components, such as a broadcast multicast service control (BMSC) and a broadcast video provisioning system (BVPS), as shown in FIG. 1. Further, assume that an application service provider (ASP) and a content provider connect to the eMBMS network components.

As further shown in FIG. 1, UE may include applications, multicast middleware (MMW), and an application programming interface (API) between the applications and the MMW. The applications may include applications that enable the UE to receive live linear video multicasts, download files, receive service notifications and/or alerts, etc. via the eMBMS network components. The MMW may include facilitate communication between the applications and the eMBMS network components. For example, the MMW may enable the applications to join live linear video multicasts, schedule file downloads, receive service notifications and/or alerts, consume segmented video streams compliant with dynamic adaptive streaming over hypertext transfer protocol (HTTP) (DASH) standards, etc. The API may enable the MMW to perform functions (e.g., registration, authentication, etc.) that enable the applications to receive services from the eMBMS network components.

In some implementations, the UE may establish an eMBMS session with the eMBMS network components, via the base station, so that the UE may request and receive a live video stream from the ASP. For example, after establishing the eMBMS session, an application (e.g., a live football broadcast application) of the UE may provide a request for the live video stream to the MMW of the UE, via the API. The MMW may provide the request to the ASP, via the base station and the eMBMS network components. The ASP may provide the live video stream to the eMBMS network components based on the request, and the eMBMS network components may provide the live video stream to the MMW of the UE, via the base station. The MMW may provide the live video stream to the application, via the API, and the application may display the live video stream to a user of the UE.

In some implementations, the UE may establish the eMBMS session so that the UE may request and receive a file download from the content provider. For example, after establishing the eMBMS session, an application of the UE may provide a request for the file download to the MMW of the UE, via the API. The MMW may provide the request to the content provider, via the base station and the eMBMS network components. The content provider may provide the file download to the eMBMS network components based on the request, and the eMBMS network components may provide the file download to the MMW of the UE, via the base station. The MMW may provide the file download to the application, via the API, and the application may store and/or execute the file download.

Systems and/or methods described herein may provide an interface between a MMW of a UE and applications of the UE so that the applications may utilize eMBMS to receive content from ASPs and/or content providers. The interface may enable developers to develop the MMW and/or the applications for receiving content via the eMBMS network components. The systems and/or methods may enable the MMW to deliver eMBMS to the UE and/or the applications of the UE.

As used herein, the term user is intended to be broadly interpreted to include a user device, or a user of a user device. The term content, as used herein, is to be broadly interpreted to include video, audio, images, software downloads, and/or combinations of video, audio, images, and software downloads.

Figure 2:
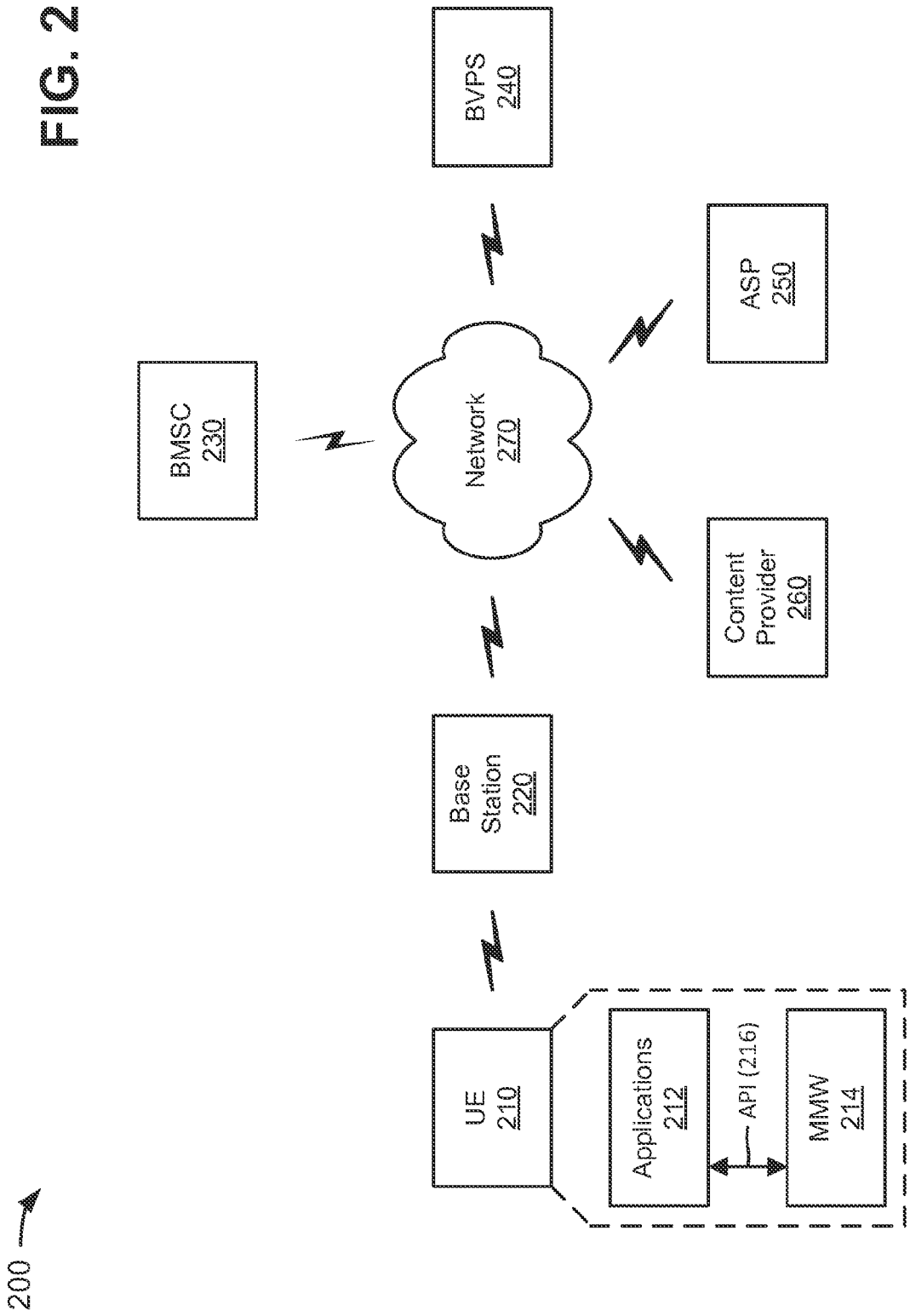
FIG. 2 is a diagram of an example environment in which systems and/or methods described herein may be implemented.

FIG. 2 is a diagram of an example environment 200 in which systems and/or methods described herein may be implemented. As illustrated, environment 200 may include a UE 210, a base station 220, a BMSC 230, a BVPS 240, an ASP 250, a content provider 260, and a network 270. Devices/networks of environment 200 may interconnect via wired connections, wireless connections, or a combination of wired and wireless connections.

UE 210 may include a device that is capable of communicating over network 270 with base station 220, BMSC 230, BVPS 240, ASP 250, and/or content provider 260. In some implementations, UE 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device. In some implementations, UE 210 may include applications 212, MMW 214, and an API 216 provided between applications 212 and MMW 214.

Applications 212 may include applications that enable UE 210 to receive audio and/or video multicasts, download files, receive service notifications and/or alerts, etc., via BMSC 230 and/or BVPS 240. In some implementations, each application 212 may include an application, a code snippet, a script, a widget, etc. that may cause UE 210 to perform one or more functions, via BMSC 230 and/or BVPS 240.

MMW 214 may facilitate communication between applications 212 and BMSC 230 and/or BVPS 240. In some implementations, MMW 214 may enable applications 212 to join audio and/or video multicasts, schedule file downloads, receive service notifications and/or alerts, consume segmented video streams compliant with DASH standards, etc., via BMSC 230 and/or BVPS 240. In some implementations, MMW 214 may provide applications 212 with access to eMBMS without requiring applications 212 to translate data received from the eMBMS, via, for example, DASH, the file delivery over unidirectional transport (FLUTE) protocol, forward error correction (FEC), etc. In some implementations, MMW 214 may process data utilizing DASH, the FLUTE protocol, FEC, etc. In some implementations, MMW 214 may interact with a modem of UE 210 to enable an eMBMS service, obtain network conditions, efficiently use modem resources to minimize battery consumption via scheduling and service announcement management, etc. In some implementations, MMW 214 may store reception reporting data (e.g., live streaming data, file delivery data, file repair data, etc.), and provide analytics, based on the data, to BMSC 230 (e.g., for operations planning).

API 216 may enable MMW 214 to perform functions (e.g., registration, authentication, verification, event notifications, service operations, etc.) that enable applications 212 to receive multicast services from BMSC 230 and/or BVPS 240. For example, API 216 may enable applications 212 and MMW 214 to request starting a multicast service, and to display (e.g., to a user) a service announcement (e.g., a program guide) available at a current location of UE 210. In another example, API 216 may enable applications 212 and MMW 214 to request starting a multicast service session, and to consume content and/or download a file. In some implementations, API 216 may enable MMW 214 and/or applications 212 to perform the functions described below in connection with, for example, FIGS. 4-12.

Base station 220 may include one or more computation and communication devices that receive traffic from BMSC 230 and/or BVPS 240 and transmit that traffic to UE 210. Base station 220 may also include one or more devices that receive traffic from UE 210 and transmit that traffic to BMSC 230 and/or BVPS 240 or to other UEs 210. Base station 220 may combine the functionalities of a base station and a radio network controller (RNC) in 2G or 3G radio access networks.

BMSC 230 may include one or more personal computers, one or more workstation computers, one or more server devices, one or more virtual machines (VMs) provided in a cloud computing network, or one or more other types of computation and communication devices. In some implementations, BMSC 230 may provide content (e.g., a video stream, an audio stream, a file, etc.) from ASP 250 and/or content provider 260 to UE 210, via an eMBMS session. In some implementations, BMSC 230 may reserve bandwidth at an event location (e.g., at a location associated with base station 220) before the event begins, and may receive live data (e.g., multimedia data) from ASP 250 when the event begins. BMSC 230 may broadcast the live data to UE 210, at the event location, when UE 210 requests the live data, and may terminate the broadcast of the live data after a predetermined time period (e.g., after the event ends).

BVPS 240 may include one or more personal computers, one or more workstation computers, one or more server devices, one or more VMs provided in a cloud computing network, or one or more other types of computation and communication devices. In some implementations, BVPS 240 may provide content (e.g., a video stream, an audio stream, a file, etc.) from ASP 250 and/or content provider 260 to UE 210, via an eMBMS session. In some implementations, BVPS 240 may include a centralized system that is responsible for communicating eMBMS session information with BMSC 230, ASP 250, and content provider 260. BVPS 240 may utilize appropriate interfaces and parameters to seamlessly create broadcast sessions with minimal impact to network traffic and while optimizing a user's quality of experience.

ASP 250 may include one or more personal computers, one or more workstation computers, one or more server devices, one or more VMs provided in a cloud computing network, or one or more other types of computation and communication devices. In some implementations, ASP 250 may provide content (e.g., a video stream, an audio stream, a file, etc.) to UE 210, via an eMBMS session established by BMSC 230 and/or BVPS 240. In some implementations, ASP 250 may provide a service, such as multimedia broadcasts, to users (e.g., UE 210) over a network, such as network 270. In implementations, ASP 250 may provide information associated with an event to BVPS 240, and may instruct a live event device (e.g., a video camera) to provide the live event data to BMSC 230 for a predetermined time period (e.g., while a football game is being played).

Content provider 260 may include one or more personal computers, one or more workstation computers, one or more server devices, one or more VMs provided in a cloud computing network, or one or more other types of computation and communication devices. In some implementations, content provider 260 may provide content (e.g., a video stream, an audio stream, a file, etc.) to UE 210, via an eMBMS session established by BMSC 230 and/or BVPS 240. In some implementations, content provider 260 may include a computer system, an application, a cable head-end, a data warehouse, and/or a broadcasting device capable of providing video content (e.g., video on demand (VOD) content, high definition (HD)-VOD content, television programming, movies, on-demand services, live television, etc.) in a variety of formats; audio content in a variety of formats; commercials; advertisements; instructions; recommendations; promotions; web-based content (e.g., streaming content from web sites); and/or other information.

Network 270 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a satellite network, a cloud computing network, or a combination of networks.

In some implementations, network 270 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UT-RAN). The EPC network may include an all-IP packet-switched core network that supports high-speed wireless and wireline broadband access technologies. The EPC network may allow UEs 210 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
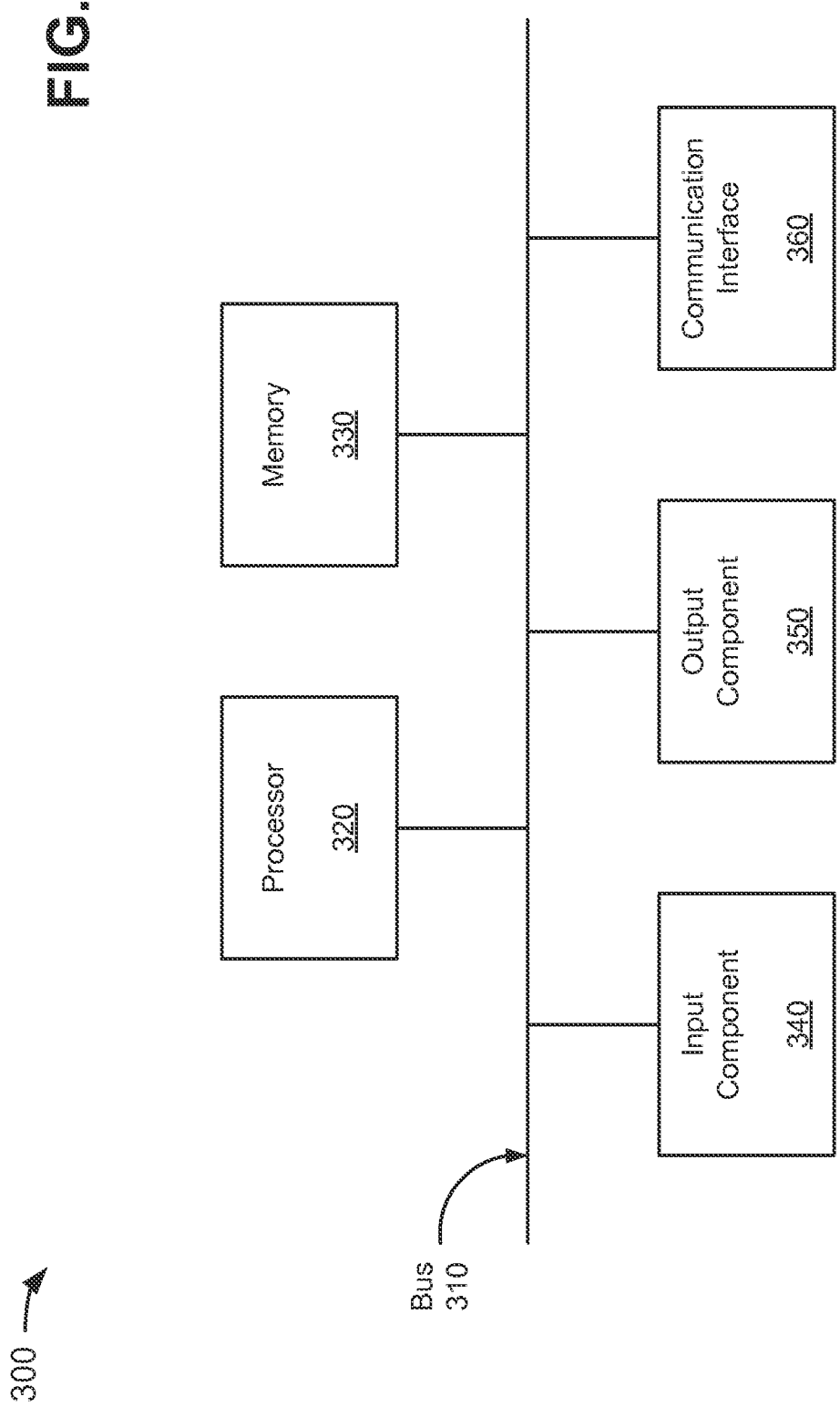
FIG. 3 is a diagram of example components of one or more devices of FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
FIG. 4 is a flow chart of an example process for receiving and configuring an eMBMS application for a UE.

FIG. 4 is a flow chart of an example process 400 for receiving and configuring an eMBMS application for a UE. In some implementations, one or more process blocks of FIG. 4 may be performed by UE 210. In some implementations, one or more process blocks of FIG. 4 may be performed by another device or a group of devices separate from or including UE 210, such as ASP 250 or content provider 260.

As shown in FIG. 4, process 400 may include receiving an eMBMS application from a device (block 410). For example, a user may cause UE 210 to provide a request for an eMBMS application to ASP 250 and/or content provider 260. In some implementations, the eMBMS application may include one of applications 212, a code snippet, a script, a widget, etc. that may enable UE 210 to perform one or more functions. For example, the eMBMS application may enable UE 210 to establish an eMBMS session with BMSC 230 and/or BVPS 240 and receive content from ASP 250 and/or content provider 260 via the eMBMS session. In some implementations, the user may cause UE 210 to access the eMBMS application (e.g., from ASP 250 and/or content provider 260) via, for example, a user interface (such as a browser) or in another manner. The user may then select, using UE 210, information regarding the eMBMS application from the user interface to cause UE 210 to provide a request for the eMBMS application to ASP 250 and/or content provider 260. In some implementations, UE 210 may receive the eMBMS application from ASP 250 and/or content provider 260, and may store the eMBMS application in a memory associated with UE 210 (e.g., memory 330, FIG. 3). In some implementations, the user, of UE 210, may establish an account associated with the eMBMS application prior to or after receiving the eMBMS application.

As further shown in FIG. 4, process 400 may include executing the eMBMS application (block 420). For example, the user may instruct UE 210 to execute the eMBMS application, and UE 210 may execute the eMBMS application based on the user's instruction. In some implementations, UE 210 may automatically execute the eMBMS application when the eMBMS application is received by UE 210. In some implementations, when the eMBMS application is executed, the eMBMS application may require the user to agree to terms and conditions of the eMBMS application, and may cause MMW 214 to be initialized. When MMW 214 is initialized, BMSC 230 may add a uniform resource locator (URL) associated with ASP 250 or content provider 260 (e.g., from which the eMBMS application is received) to a URL list in a configuration file. In some implementations, the configuration file may include a set of configuration parameters for the eMBMS application, and information describing eMBMS transport needed for UE 210 to receive a service discovery channel (SDCH). MMW 214 may receive the configuration file and the URL list from BMSC 230, and may store the configuration file and the URL list.

As further shown in FIG. 4, process 400 may include generating a registration request for the eMBMS application (block 430). For example, the eMBMS application may generate a registration request for the eMBMS application, and may provide the registration request to MMW 214. In some implementations, the eMBMS application may authenticate with ASP 250 or content provider 260 (e.g., from which the eMBMS application is received) prior to generating the registration request. In some implementations, the registration request may include a service class requested by the eMBMS application, the URL associated with ASP 250 or content provider 260, etc.

As further shown in FIG. 4, process 400 may include verifying the authentication of the eMBMS application based on the registration request (block 440). For example, MMW 214 may verify the authentication of the eMBMS application based on the registration request received from the eMBMS application. In some implementations, MMW 214 may compare the URL associated with ASP 250 or content provider 260 with the URLs provided in the URL list received from the BMSC 230. If the URL associated with ASP 250 or content provider 260 does not match a URL provided in the URL list, MMW 214 may determine that the eMBMS application is not authenticated. If the URL associated with ASP 250 or content provider 260 matches a URL provided in the URL list, MMW 214 may conduct a signature verification with ASP 250 or content provider 260 by providing a signature of the eMBMS application to ASP 250 or content provider 260. ASP 250 or content provider 260 may compare the signature of the eMBMS application with a signature stored by ASP 250 or content provider 260. If the signatures do not match, ASP 250 or content provider 260 may return a failure notification and MMW 214 may determine that the eMBMS application is not authenticated. If the signatures match, ASP 250 or content provider 260 may return a success notification and MMW 214 may determine that the eMBMS application is authenticated.

As further shown in FIG. 4, process 400 may include determining a registration success or failure of the eMBMS application based on the verification (block 450). For example, MMW 214 may determine whether the registration of the eMBMS application is a success or a failure based on the verification of the authentication of the eMBMS application. In some implementations, if MMW 214 determines that the eMBMS application is authenticated, MMW 214 may determine that the registration of the eMBMS application is a success. In some implementations, if MMW 214 determines that the eMBMS application is not authenticated, MMW 214 may determine that the registration of the eMBMS application is a failure. In some implementations, if the registration of the eMBMS application is a success, MMW 214 may associate the service class with the eMBMS application.

As further shown in FIG. 4, process 400 may include generating a start eMBMS service request (block 460). For example, if the registration of the eMBMS application is a success, the eMBMS application may generate a start eMBMS service request, and may provide the start eMBMS service request to MMW 214. In some implementations, the start eMBMS service request may include a request to receive content from ASP 250 and/or content provider 260, via an eMBMS session generated by BMSC 230 and/or BVPS 240. In some implementations, MMW 214 may only accept start eMBMS service requests from applications 212 that are successfully registered, as described above. In such implementations, MMW 214 may reuse the authentication verification without making unnecessary connections with ASP 250, which may result from possible application malfunctions and attacks. MMW 214 may utilize a reregister interval timer to mitigate an impact from possible rogue application attacks, such as issuing a flood of API calls alternating between registration and deregistration.

As further shown in FIG. 4, process 400 may include determining whether the eMBMS service is available based on the start eMBMS service request (block 470). For example, MMW 214 may determine whether the eMBMS service is available based on the start eMBMS service request. In some implementations, MMW 214 may instruct a modem manager of UE 210 to acquire service announcement information and available service session information (e.g., from ASP 250 or content provider 260) before providing a service session list to the eMBMS application. In some implementations. MMW 214 may determine whether the eMBMS service is available based on the service announcement information and the available service session information (e.g., received from ASP 250 or content provider 260).

As further shown in FIG. 4, process 400 may include displaying information associated with the eMBMS service (block 480). For example, MMW 214 may cause UE 210 (e.g., the eMBMS application) to display information indicating whether the eMBMS service is available or unavailable. In some implementations, MMW 214 may cause UE 210 to display the service announcement information and the available service session information (e.g., which may indicate whether the eMBMS service is available or unavailable). In some implementations, MMW 214 may provide a start eMBMS service response (e.g., indicating whether the eMBMS service is available or unavailable) to the eMBMS application, and the eMBMS application may cause UE 210 to display the start eMBMS service response.

In some implementations, the eMBMS application (e.g., application 212) may be in an inactive state when the eMBMS application has successfully registered with MMW 214. The eMBMS application may be in an active state when the eMBMS application has successfully registered with MMW 214 and has successfully started an eMBMS service with MMW 214.

In some implementations, a registered application 212 may no longer be running in memory (e.g., due to application 212 failing or being uninstalled by the user) without having a chance to notify MMW 214. MMW 214 may check whether application 212 still remains in memory every time when a re-joining timer expires. If MMW 214 determines that application 212 is no longer in memory, MMW 214 may change a registration status of application to non-registered, and may disable the re-joining timer when no application 212 is registered.

In some implementations, after receiving a start eMBMS service request from application 212, MMW 214 may provide application 212 with a service session list that includes available stream sessions according to a service area identity (SAI) list, and an announced file download session on all bands. Each session entry of the service session list may include a session service class, a service identifier, a service title, a schedule, associated media presentation description (MPD) URLs (e.g., for a stream), etc. In some implementations, each service identifier of a session entry may represent either a single stream session or a group of file delivery sessions. Each file delivery session may be identified by a unique file uniform resource identifier (URI) specified in the schedule. A session entry may use the file URI to identify each file delivery service. API 216 may provide a method for application 212 to select or deselect the stream and/or file sessions. In some implementations, MMW 214 may dynamically update active application(s) 212 with an updated service session list while receiving an in-band MPD, a schedule, an updated SAI list, etc. as UE 210 moves into a new cell.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
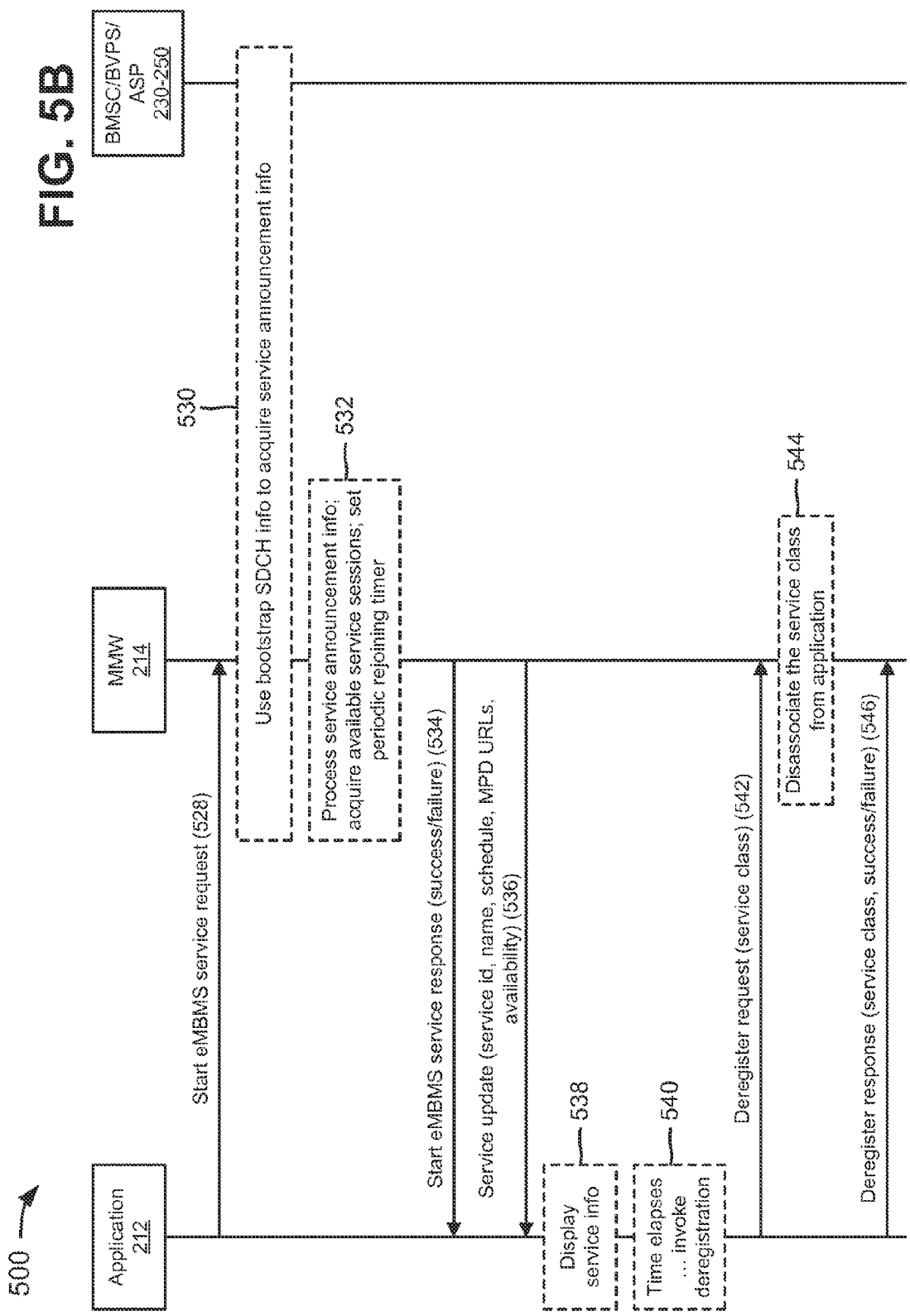

FIGS. 5A and 5B are diagrams of an example call flow 500 relating to example process 400 shown in FIG. 4. As shown in FIG. 5A, application 212 may include an eMBMS application, and UE 210 may generate an eMBMS application download request 502, and may provide request 502 to ASP 250, via BMSC 230 and/or BVPS 240. UE 210 may download application 212 from ASP 250, based on request 502, as indicated by reference number 504. The user of UE 210 may execute application 212, and execution of application 212 may require the user to agree to terms and conditions and to a memory storage setting for application 212, as indicated by reference number 506 in FIG. 5A. Execution of application 212 may cause MMW 214 to initialize, as indicated by reference number 508, and may cause ASP 250 to deliver a SDCH and a URL list to MMW 214 and to provide content on bearers, as indicated by reference number 510. As further shown in FIG. 5A, MMW 214 may perform a bootstrap procedure with ASP 250 in order to receive a configuration file for application 212 from ASP 250, as indicated by reference number 512.

Application 212 may perform an authentication with ASP 250, for a unicast service provided by ASP 250, as indicated by reference number 514. As further shown in FIG. 5A, application 212 may provide a registration request 516 to MMW 214. Registration request 516 may include a service class requested by application 212, a URL associated with ASP 250, and a storage location of application 212. MMW 214 may obtain, from application 212, application signatures and/or identifiers based on registration request 516, as indicated by reference number 518. MMW 214 may verify an availability of the service class based on registration request 516, as indicated by reference number 520, and may verify the authentication of application 212 with ASP 250, as indicated by reference number 522. If MMW 214 verifies the authentication of application 212 with ASP 250. MMW 214 may associate the service class with application 212, as indicated by reference number 524, and may provide a registration response 526 to application 212. Registration response 526 may include information indicating whether application 212 is authenticated.

As shown in FIG. 5B, if MMW 214 verifies the authentication of application 212 with ASP 250, application 212 may provide a start eMBMS service request 528 to MMW 214. Request 528 may include a request to start an eMBMS service (e.g., live streaming video). MMW 214 may perform a bootstrap procedure with ASP 250 to obtain service announcement information from ASP 250, as indicated by reference number 530. MMW 214 may process the service announcement information, may acquire available service sessions from ASP 250, and may set a periodic rejoining timer, as indicated by reference number 532 in FIG. 5B. MMW 214 may determine whether the eMBMS service is available based on start eMBMS service request 528. In some implementations, MMW 214 may determine whether the eMBMS service is available based on the service announcement information and the available service session information (e.g., received from ASP 250).

As further shown in FIG. 5B, MMW 214 may provide a start eMBMS service response 534 to application 212. Start eMBMS service response 534 may include information indicating whether the eMBMS service is available or unavailable for application 212. In some implementations, if the eMBMS service is unavailable, response 534 may include a reason that the eMBMS service is unavailable, such as: being outside of eMBMS service coverage (e.g., when UE 210 is outside of a service area); entering the eMBMS service coverage (e.g., when UE 210 enters a service area from a non-service area); the service session being unavailable (e.g., when UE 210 moves to an area where a current session is unavailable); poor signal and service quality (e.g., when a calculated service quality is lower than that required); being unable to start a session (e.g., when MMW 214 is unable to locate a requested temporary mobile group identity (TMGI)); registration being expired (e.g., when application 212 requests services after application 212 deregistered); and/or being unable to allocate a resource (e.g., when MMW 214 is unable to process a requested service due to insufficient resources).

As further shown in FIG. 5B, if the eMBMS service is available, MMW 214 may provide a service update message 536 to application 212. Service update message 536 may include an identifier, a name, a schedule, URLs, availability, etc. associated with the eMBMS service. Application 212 may cause UE 210 to display information provided in start eMBMS service response 534 (e.g., the service information), as indicated by reference number 538. Application 212 may utilize the eMBMS service over time, and eventually may want to deregister from the service class associated with the eMBMS service, as indicated by reference number 540. Application 212 may provide a deregister request 542 (e.g., identifying the service class) to MMW 214, and MMW 214 may disassociate the service class from application 212, based on deregister request 542 and as indicated by reference number 544. MMW 214 may provide a deregister response 546 (e.g., indicating whether deregistering the service class is a success or a failure) to application 212. If deregistering the service class is a success, application 212 may be disassociated from the service class.

In some implementations, MMW 214 may handle receipt an application re-registration request, without receiving a deregister request, by comparing a previous set of identities associated with application 212 (e.g., a name, an identifier, a service class, an ASP URL, a signature, etc. associated with application 212) to verify that application 212 is the same application that previously passed the authentication verification process. If MMW 214 verifies that application 212 previously passed the authentication verification process, MMW 214 may re-register application 212 without conducting signature verification with ASP 250.

As indicated above, FIGS. 5A and 5B are provided merely as an example. Other examples are possible and may differ from what was described with regard to FIGS. 5A and 5B.

Figure 6:
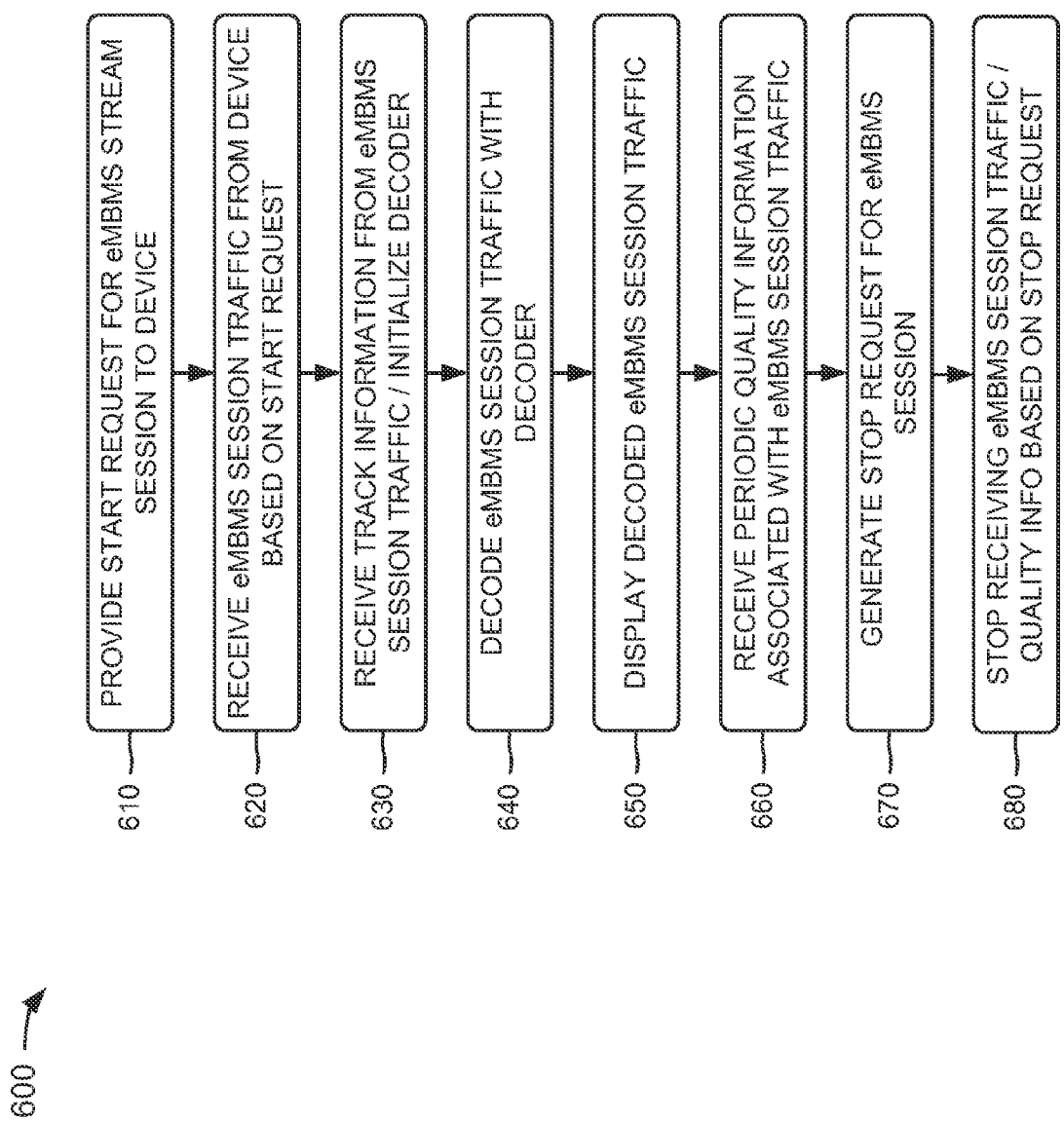
FIG. 6 is a flow chart of an example process for receiving eMBMS session traffic via a UE.

FIG. 6 is a flow chart of an example process 600 for receiving eMBMS session traffic via a UE. In some implementations, one or more process blocks of FIG. 6 may be performed by UE 210. In some implementations, one or more process blocks of FIG. 6 may be performed by another device or a group of devices separate from or including UE 210.

As shown in FIG. 6, process 600 may include providing a start request for an eMBMS stream session to a device (block 610). For example, assume that a user utilizes UE 210 to execute application 212, and that application 212 causes UE 210 to receive content (e.g., a live video stream of a football game) via an eMBMS session with BMSC 230 and/or BVPS 240. In some implementations, when application 212 executes, application 212 may generate a start request for an eMBMS stream session, and may provide the start request to MMW 214. MMW 214 may receive the start request, and may utilize the start request to request the eMBMS stream session from ASP 250, via BMSC 230 and/or BVPS 240. In some implementations, MMW 214 may provide the start request for the eMBMS stream session to ASP 250, via BMSC 230 and/or BVPS 240. In some implementations, MMW 214 may instruct a modem of UE 210 to prepare the eMBMS stream session based on the start request.

As further shown in FIG. 6, process 600 may include receiving eMBMS session traffic from the device based on the start request for the eMBMS stream session (block 620). For example, ASP 250, via BMSC 230 and/or BVPS 240, may deliver the SDCH and the eMBMS stream session on bearers, and MMW 214 may receive eMBMS session traffic (e.g., the live video stream of the football game) from the bearers based on the start request. In some implementations, MMW 214 may receive FLUTE source and repair packets for the eMBMS session traffic, and may perform FEC decoding of the eMBMS session traffic. In some implementations, MMW 214 may provide, to application 212, a response to the start request. The response may include an identifier associated with the eMBMS session, a status of the eMBMS session traffic, etc.

As further shown in FIG. 6, process 600 may include receiving track information from the eMBMS session traffic and initializing a decoder (block 630). For example, a media player (e.g., a video player) of UE 210 may receive track information from the eMBMS session traffic (e.g., track information associated with live video stream of the football game), and may initialize a decoder of UE 210. In some implementations, application 212 may select a corresponding MPD URL for the eMBMS session traffic, and may create a media presentation (MP) prior to the media player receiving the track information and initializing the decoder. In such implementations, application 212 may provide the MPD URL to a DASH client of UE 210, may start the MP, and may execute the DASH client. The executing DASH client may receive the MPD from MMW 214, and the media player may receive the track information from the DASH client.

As further shown in FIG. 6, process 600 may include decoding the eMBMS session traffic with the decoder (block 640). For example, the decoder of UE 210 may decode the eMBMS session traffic (e.g., the live video stream of the football game). In some implementations, the decoder may include a component (e.g., a hardware accelerator) that decodes the eMBMS session traffic from a format provided by ASP 250 to a format that is understood by the media player of UE 210. In some implementations, the DASH client may receive the eMBMS session traffic from MMW 214, and may provide the eMBMS session traffic to the decoder so that the decoder may decode the eMBMS session traffic.

As further shown in FIG. 6, process 600 may include displaying the decoded eMBMS session traffic (block 650). For example, the decoder of UE 210 may provide the decoded eMBMS session traffic (e.g., a decoded video stream, a decoded audio stream, etc.) to the media player of UE 210, and the media player may cause UE 210 to display the decoded eMBMS session traffic and the track information to the user. For example, the media player may cause UE 210 to display the live video stream of the football game to the user. In some implementations, the media player may enable the user to start, stop, rewind, etc. the live video stream of the football game.

As further shown in FIG. 6, process 600 may include receiving periodic quality information associated with the eMBMS session traffic (block 660). For example, as UE 210 is displaying the eMBMS session traffic (e.g., the live video stream of football game) to the user, MMW 214 may provide periodic quality information associated with the live video stream to application 212 and application 212 may cause UE 210 to display the quality information. In some implementations, to improve the user experience, when UE 210 displays the eMBMS session traffic, MMW 214 may provide, to application 212, a service quality indication (SQI) based on a generated FEC failure rate associated with the eMBMS session traffic. In some implementations, the SQI may include a binary value that indicates either good service quality or bad service quality. The binary value assigned to the SQI may be determined based on a comparison of the FEC failure rate and a particular threshold. In some implementations, the good service quality value may be generated by MMW 214 when the FEC failure rate is less than or equal to the particular threshold, and the bad service quality value may be generated by MMW 214 when the FEC failure rate is greater than the particular threshold. For example, if the FEC failure rate is 20% and the particular threshold is 40%, MMW 214 may provide the good service quality value to application 212. However, if the FEC failure rate increases to 50%, MMW 214 may provide the bad service quality value to application 212.

In some implementations, MMW 214 may notify application 212 when the FEC failure rate is greater than a bad service presentation threshold for a particular time period (e.g., defined by a time period associated with bad service presentation hysteresis). In some implementations, the bad service presentation threshold (T) may be defined as a percentage, and the bad service presentation hysteresis (H) may be defined as a number of consecutive FEC failure rate time periods. For example, if T is 75% and H is three, MMW 214 may notify application 212 if the FEC failure rate in each of three time periods is greater than T (e.g., when the FEC failure rate is 80%, 100%, and 80% for the three time periods).

As further shown in FIG. 6, process 600 may include generating a stop request for the eMBMS session (block 670). For example, the user of UE 210 may eventually wish to stop receiving the eMBMS session traffic (e.g., the live video stream of the football game) or transmission of the eMBMS session traffic (e.g., the broadcast of the football game) may end. In some implementations, the user may instruct application 212 to stop the eMBMS session. In some implementations, application 212 may decide to stop the eMBMS session (e.g., when the football game ends). Based on the decision to stop the eMBMS session, application 212 may generate a stop request for the eMBMS session, and may provide the stop request to MMW 214. MMW 214 may receive the stop request, and may provide the stop request to the modem of UE 210. In some implementations, the stop request may include an identifier associated with the eMBMS session.

As further shown in FIG. 6, process 600 may include stopping receipt of the eMBMS session traffic and the periodic quality information based on the stop request (block 680). For example, based on the stop request, MMW 214 and the modem of UE 210 may stop receiving the eMBMS session traffic from ASP 250. In some implementations, based on the stop request, MMW 214 may stop determining the periodic quality information associated with the eMBMS session traffic, and may stop providing the periodic quality information to application 212. In some implementations, application 212 may release the MP and may instruct the DASH client to stop executing. In some implementations, MMW 214 may provide a stop response to application 212. The stop response may include the identifier associated with the eMBMS session and information identifying a status of the stop request (e.g., successfully completed or failed).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
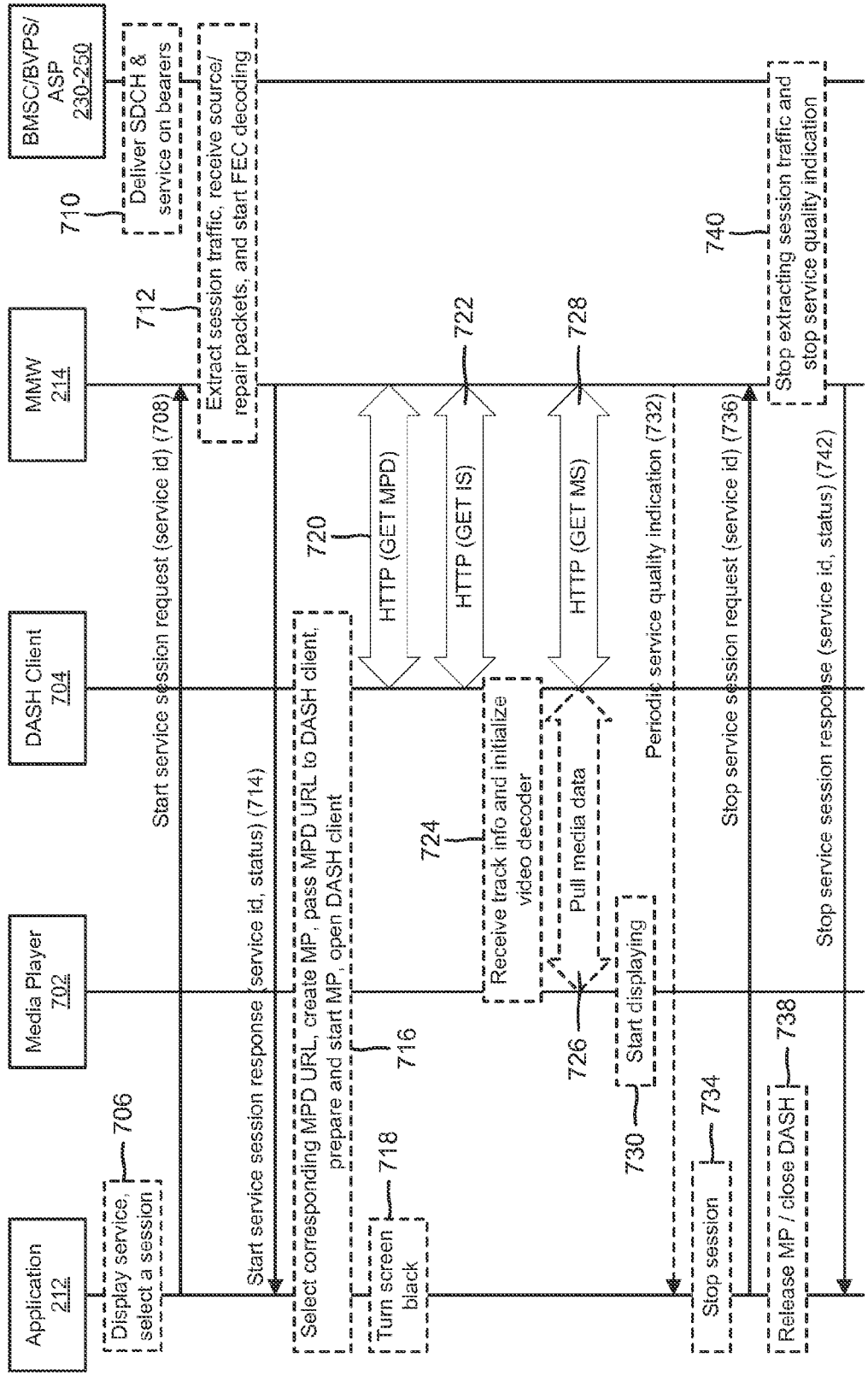
FIG. 7 is a diagram of an example call flow relating to the example process shown in FIG. 6.

FIG. 7 is a diagram of an example call flow 700 relating to example process 600 shown in FIG. 6. Assume that ASP 250 is broadcasting a live streaming video of a concert (e.g., eMBMS session traffic), and application 212 enables UE 210 to receive and play the live streaming video of the concert to a user of UE 210. As shown in FIG. 7, UE 210 may include a media player 702 and a DASH client 704. Media player 702 may include a player that is capable of playing content (e.g., a video stream, an audio stream, etc.). DASH client 704 may utilize the DASH protocol to stream live content on UE 210. DASH client 704 may receive a MPD URL from application 212, and may obtain (e.g., using HTTP) and decode a MPD file. DASH client 704 may obtain DASH content segments according to the MPD file, and may provide the content segments to the decoder of UE 210.

As further shown in FIG. 7, assume that the user selects application 212, as indicated by reference number 706. Selection of application 212 may cause application 212 to execute, and the executing application 212 may provide a start request 708 for an eMBMS stream session to MMW 214. MMW 214 may receive start request 708, and may utilize start request 708 to request the eMBMS stream session from ASP 250, via BMSC 230 and/or BVPS 240. ASP 250 may deliver the SDCH and the eMBMS stream session on bearers, via BMSC 230 and/or BVPS 240 and as indicated by reference number 710. MMW 214 may receive the live streaming video of the concert from the bearers, may receive FLUTE source and repair packets for the live streaming video, and may perform FEC decoding of the live streaming video, as indicated by reference number 712. MMW 214 may provide, to application 212, a response 714 to start request 708. Response 714 may include an identifier associated with the eMBMS session and a status of the live streaming video of the concert.

As further shown in FIG. 7, application 212 may select a corresponding MPD URL for the live streaming video of the concert, may create a MP, may provide the MPD URL to DASH client 704, may start the MP, and may execute DASH client 704, based on response 714 and as indicated by reference number 716. Application 212 may cause UE 210 to display a blank screen or a backsplash screen, based on response 714 and as indicated by reference number 718. DASH client 704 and MMW 214 may perform a HTTP GET MPD process 720. During process 720, MMW 214 may extract different types of DASH files (e.g., the MPD file) that are FLUTE protected by FEC, and may store the MPD file. DASH client 704 may request the MPD file during process 720, and MMW 214 may provide the MPD file to DASH client 704 based on the request. DASH client 704 and MMW 214 may perform a HTTP GET initialization segments (IS) process 722. During process 722, MMW 214 may receive initialization segments of the live streaming video of the concert, and may convert the initialization segments into a format understood by DASH client 704 (e.g., a binary format). DASH client 704 may request the initialization segments during process 722, and MMW 214 may provide the converted initialization segments to DASH client 704 based on the request.

As further shown in FIG. 7, DASH client 704 and/or media player 702 may receive track information associated with the live streaming video of the concert, and may initialize a decoder of UE 210, as indicated by reference number 724. If DASH client 704 receives the track information, media player 702 may obtain the track information from DASH client 704. DASH client 704 may receive data (e.g., metadata) associated with the live streaming video of the concert, and media player 702 may obtain the data from DASH client 704, as indicated by reference number 726. DASH client 704 and MMW 214 may perform a HTTP GET media segments (MS) process 728. During process 728, MMW 214 may receive media segments of the live streaming video of the concert, and may store the media segments. DASH client 704 may request the media segments during process 728, and MMW 214 may provide the media segments to DASH client 704 based on the request. As the media segments are received, media player 702 may begin displaying the media segments (e.g., the live streaming video of the concert), as indicated by reference number 730.

As media player 702 is displaying the live streaming video of the concert, MMW 214 may provide a periodic service quality indication 732 associated with the live streaming video of the concert to application 212. Service quality indication 732 may include an indication of good service quality or bad service quality for the live streaming video of the concert. As further shown in FIG. 7, assume that the user of UE 210 decides to stop using application 212 (e.g., stop viewing the live streaming video of the concert), and that application 212 stops the eMBMS session, as indicated by reference number 734. When application 212 stops the eMBMS session, application 212 may generate a stop request 736 for the eMBMS session, and may provide stop request 736 to MMW 214. Application 212 may release the MP and may instruct DASH client 704 to stop executing, as indicated by reference number 738.

As further shown in FIG. 7, based on stop request 736, MMW 214 may stop receiving the live streaming video of the concert from ASP 250, and may stop providing service quality indication 732 to application 212, as indicated by reference number 740. MMW 214 may provide, to application 212, a stop response 742 that includes information identifying a status of stop request 736 (e.g., successfully completed or failed).

As indicated above, FIG. 7 is provided merely as an example. Other examples are possible and may differ from what was described with regard to FIG. 7.

Figure 8:
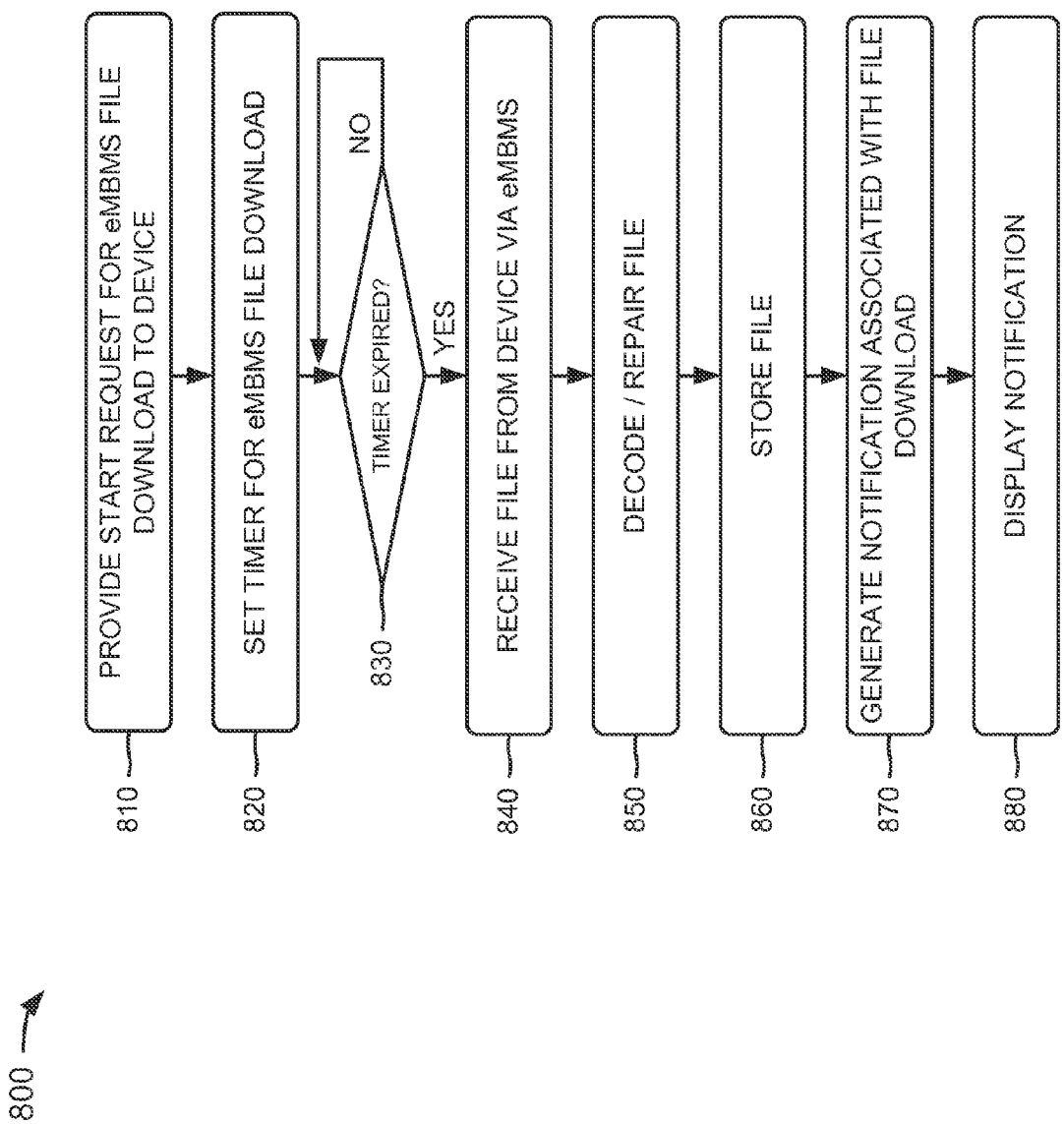
FIG. 8 is a flow chart of an example process for receiving an eMBMS file download via a UE.

FIG. 8 is a flow chart of an example process 800 for receiving an eMBMS file download via a UE. In some implementations, one or more process blocks of FIG. 8 may be performed by UE 210. In some implementations, one or more process blocks of FIG. 8 may be performed by another device or a group of devices separate from or including UE 210.

As shown in FIG. 8, process 800 may include providing a start request for an eMBMS file download to a device (block 810). For example, assume that a user utilizes UE 210 to execute application 212, and that application 212 causes UE 210 to request a file download (e.g., of a software file, a video file, an audio file, etc.) from content provider 260, via an eMBMS session with BMSC 230 and/or BVPS 240. In some implementations, when application 212 executes, application 212 may generate a start request for an eMBMS file download, and may provide the start request to MMW 214. MMW 214 may receive the start request, and may utilize the start request to request the eMBMS file download from content provider 260, via BMSC 230 and/or BVPS 240. In some implementations, MMW 214 may provide the start request for the eMBMS file download to content provider 260, via BMSC 230 and/or BVPS 240.

As further shown in FIG. 8, process 800 may include setting a timer for the eMBMS file download (block 820). For example, based on the start request, MMW 214 may set a timer for the eMBMS file download, and may verify whether an eMBMS session is available for downloading the file. In some implementations, the timer may be set by the user and/or application 212. In some implementations, the timer may include a value in seconds, minutes, hours, days, etc. For example, assume that at 10:00 PM the user wants to download a movie, and that the user indicates (e.g., to application 212) that the movie should be available by 7:00 AM the next morning. In such an example, timer may be set to less than nine (9) hours (e.g., to account for downloading time) so that the movie is ready to view by 7:00 AM. In some implementations, MMW 214 may provide, to application 212, a response to the start request. The response may include an identifier associated with the eMBMS session, a status of the start request (e.g., successfully scheduled), etc.

As further shown in FIG. 8, process 800 may include determining whether the timer has expired (block 830). For example, MMW 214 may determine whether the timer for the eMBMS file download has expired. In some implementations, MMW 214 may periodically determine whether the timer has expired. In some implementations, the timer may alert MMW 214 when the timer is about to or has expired. For example, if the timer is set to eight (8) hours at 10:00 PM, the timer may alert MMW 214 that the timer has expired at 6:00 AM the next day.

As further shown in FIG. 8, if the timer has expired (block 830—NO), process 800 may return to process block 830. For example, if MMW 214 determines that the timer for the eMBMS file download has not expired. MMW 214 may wait a period of time before checking again whether the timer has expired. In some implementations, MMW 214 may determine that the timer has not expired when MMW 214 does not receive an alert from the timer. For example, if the timer is set to seven (7) hours at 11:00 PM, MMW 214 may determine that the timer has not expired at 4:00 AM the next day since MMW 214 may not receive an alert from the timer until 6:00 AM the next day.

As further shown in FIG. 8, if the timer has expired (block 830—YES), process 800 may include receiving the file from the device via eMBMS (block 840). For example, if MMW 214 determines that the timer for the eMBMS file download has expired, MMW 214 may begin downloading the file from content provider 260, via BMSC 230 and/or BVPS 240. In some implementations, MMW 214 may determine that the timer has expired when MMW 214 receives an alert from the timer. In some implementations, MMW 214 may begin downloading the file from content provider 260 before the timer expires (e.g., during non-busy times).

As further shown in FIG. 8, process 800 may include decoding and/or repairing the file (block 850). For example, MMW 214 may perform FEC decoding of the file to repair any missed packets during the download of the file from content provider 260. In some implementations, MMW 214 may receive FLUTE source and repair packets for the file in order to repair any missed packets. In some implementations, if no packets are missed during the download of the file from content provider 260, MMW 214 may not decode and/or repair the file.

As further shown in FIG. 8, process 800 may include storing the file (block 860). For example, MMW 214 may cause UE 210 to store the file in memory (e.g., memory 330, FIG. 3). In some implementations, if MMW 214 decodes and/or repairs the file, during the download, MMW 214 may cause UE 210 to store the decoded and/or repaired file in memory. In some implementations, UE 210 may store the file in memory, and may replace the file with the decoded and/or repaired file.

As further shown in FIG. 8, process 800 may include generating a notification associated with the file download (block 870). For example, MMW 214 may generate a notification associated with the file download. In some implementations, if the file does not need to be repaired, the notification may include information indicating that the file download is complete, an identifier associated with the eMBMS session used to download the file, etc. In some implementations, if the file is successfully repaired, the notification may include information indicating that the file download is complete, the identifier associated with the eMBMS session used to download the file, etc. In some implementations, if the file is unsuccessfully repaired (e.g., if the file is missing a number of packets greater than a particular threshold), the notification may include information indicating that the file download failed. In some implementations, if the file download failed, MMW 214 may attempt to download the file a particular number of times. In some implementations, MMW 214 may provide the notification to application 212. In some implementations, MMW 214 may provide the notification to BMSC 230 (e.g., in the form of a report).

As further shown in FIG. 8, process 800 may include displaying the notification (block 880). For example, application 212 may cause UE 210 to display the notification to the user. In some implementations, application 212 may cause UE 210 to display information indicating that the file download is complete and/or successful. In some implementations, application 212 may cause UE 210 to display information indicating that the file download failed.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
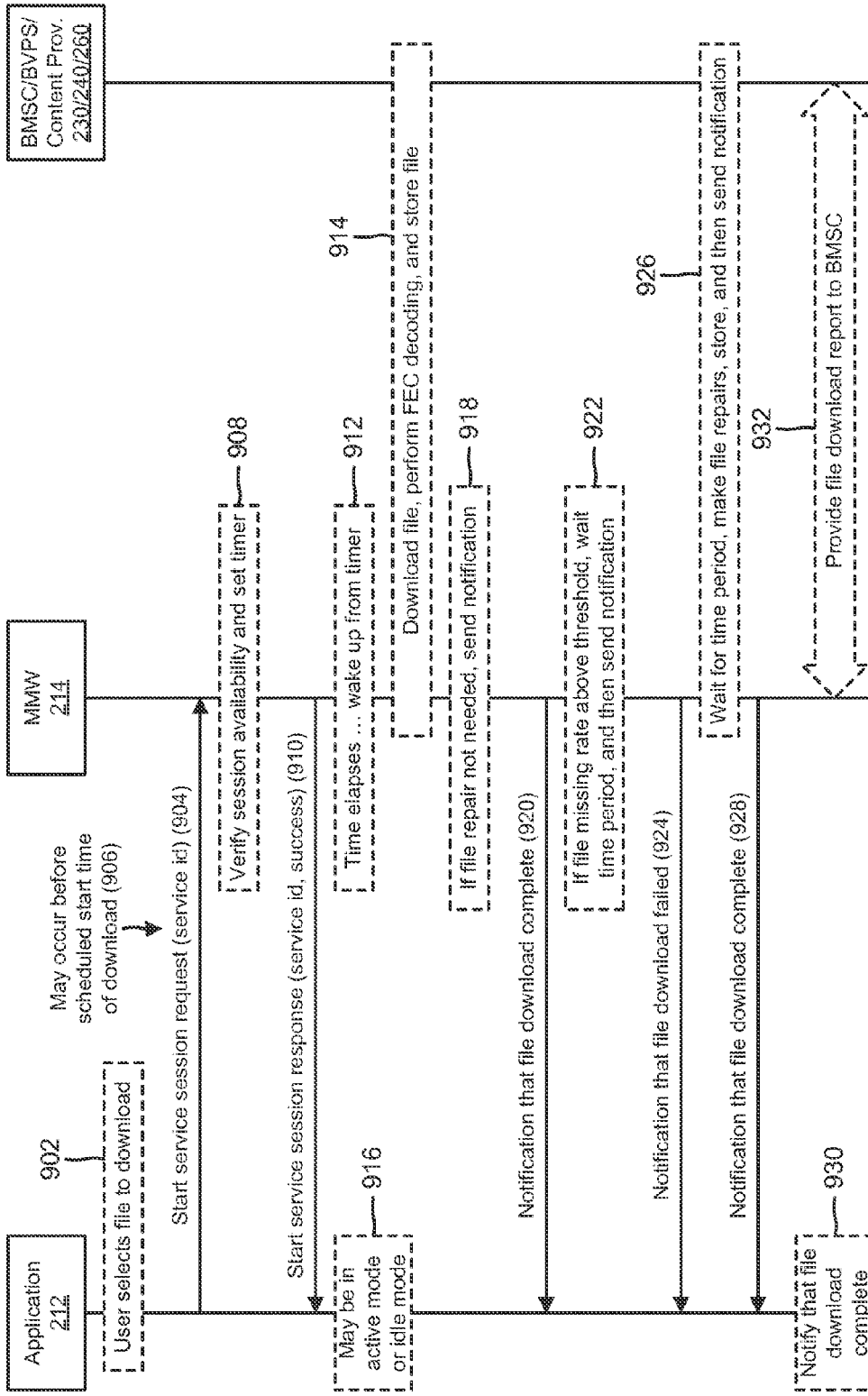
FIG. 9 is a diagram of an example call flow relating to the example process shown in FIG. 8.

FIG. 9 is a diagram of an example call flow 900 relating to example process 800 shown in FIG. 8. Assume that content provider 260 stores a software file (e.g., an eMBMS file download) to be used by application 212, and that the user of UE 210 utilizes application 212 to select information identifying the software file, as indicated by reference number 902. Selection of the information identifying the software file may cause application 212 to provide a start request 904 for downloading the software file to MMW 214. MMW 214 may receive start request 904, and may utilize start request 904 to request the software file from content provider 260, via BMSC 230 and/or BVPS 240. As further shown in FIG. 9, application 212 may provide start request 904 to MMW 214 before a scheduled start time of the download of the software file (e.g., in seconds, minutes, hours, days, etc.), as indicated by reference number 906.

Based on start request 904, MMW 214 may verify that an eMBMS session is available to download the software file, and may set a timer for scheduling the download of the software file, as indicated by reference number 908. MMW 214 may provide, to application 212, a response 910 to start request 904. Response 910 may include an identifier associated with the eMBMS session and a status of the download of the software file. When the timer expires, MMW 214 may wake up for the download of the software file, as indicated by reference number 912 in FIG. 9. MMW 214 may download the software file from content provider 260, may perform FEC decoding of the software file, and may store the software file, as indicated by reference number 914. Application 212 may be in an active mode (e.g., utilizing other eMBMS sessions) or in an idle mode (e.g., stopped) when MMW 214 downloads the software file, as indicated by reference number 916.

In some implementations, if the software file does not need to be repaired, MMW 214 may determine that a notification, associated with the download of the software file, is to be provided to application 212, as indicated by reference number 918. In such implementations, MMW 214 may provide, to application 212, a notification 920 indicating that the download of the software file is complete and successful. In some implementations, if the software file is missing a number of packets greater than a threshold, MMW 214 may determine that another notification, associated with the download of the software file, is to be provided to application 212, as indicated by reference number 922. In such implementations, MMW 214 may provide, to application 212, a notification 924 indicating that the download of the software file failed. In some implementations, if the software file needs to be repaired, MMW 214 may repair the software file, store the repaired software file, and determine that a notification, associated with the download of the software file, is to be provided to application 212, as indicated by reference number 926. In such implementations, MMW 214 may provide, to application 212, a notification 928 indicating that the download of the software file is complete and successful.

As further shown in FIG. 9, application 212 may notify the user of UE 210 that the download of the software file is complete, as indicated by reference number 930. MMW 214 may provide a file download report (e.g., indicating whether the download of the software file was a success or a failure) to BMSC 230, as indicated by reference number 932.

As indicated above, FIG. 9 is provided merely as an example. Other examples are possible and may differ from what was described with regard to FIG. 9.

Figure 10:
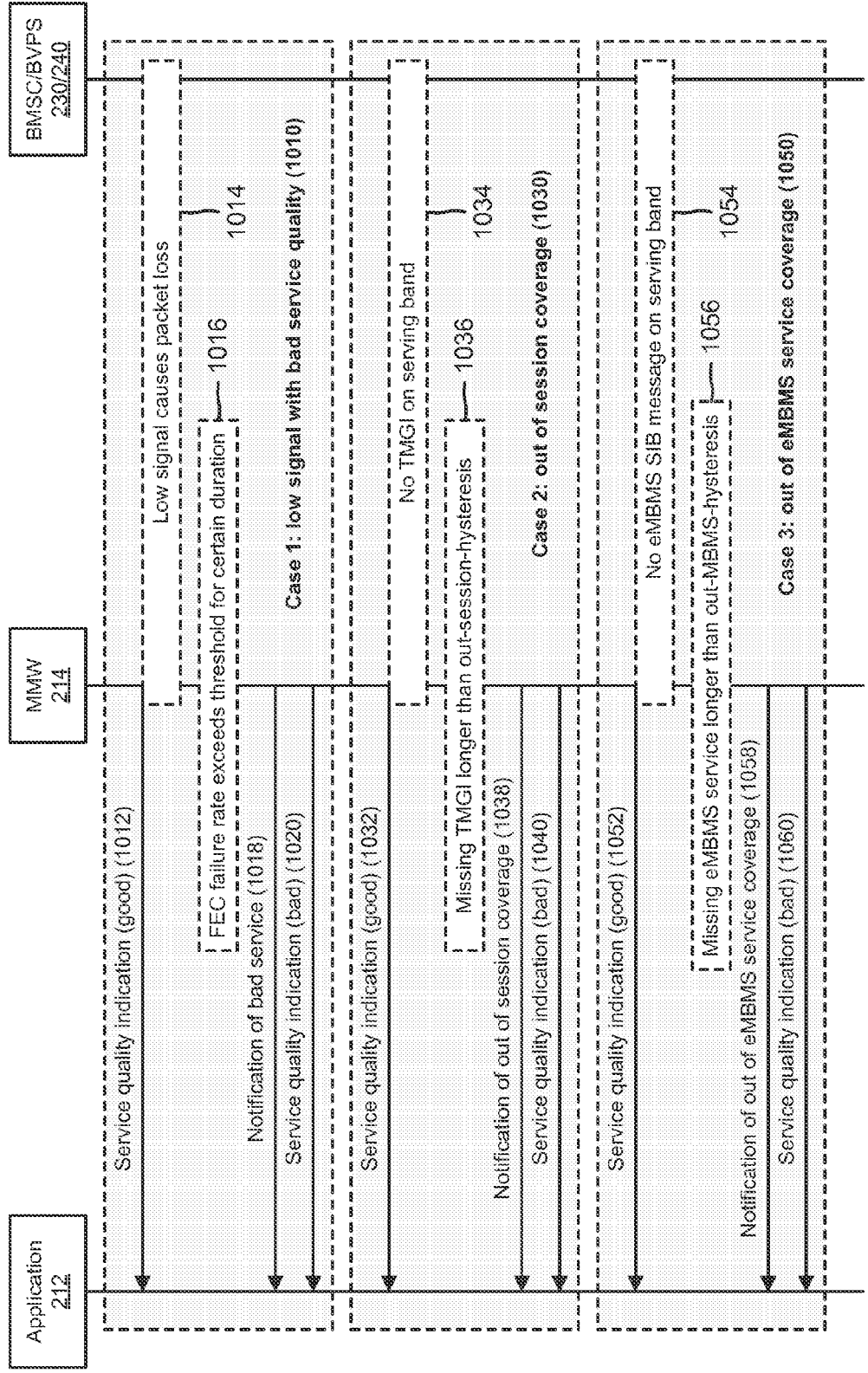
FIG. 10 is a diagram of an example call flow relating to eMBMS quality and coverage for a UE.

FIG. 10 is a diagram of an example call flow 1000 relating to eMBMS quality and coverage for a UE. As shown, service quality and coverage for UE 210 may include a first case scenario 1010 associated with a low quality signal with bad service quality for UE 210. Assume that UE 210 initially is experiencing a high quality signal with good service quality (e.g., with BMSC 230 and/or BVPS 240), and that MMW 214 provides, to application 212, a service quality indication 1012 indicating that the service quality for UE 210 is good. Now assume that MMW 214 determines that a low quality signal (e.g., causing packet loss) is received from BMSC 230 and/or BVPS 240, as indicated by reference number 1014. MMW 214 may determine that a FEC failure rate of the session exceeds a threshold for a particular duration, as indicated by reference number 1016. Based on these determinations, MMW 214 may provide, to application 212, a notification 1018 indicating that UE 210 is experiencing bad service from BMSC 230 and/or BVPS 240. MMW 214 may also provide, to application 212, a service quality indication 1020 indicating that the service quality for UE 210 is bad.

As further shown in FIG. 10, service quality and coverage for UE 210 may include a second case scenario 1030 associated with out of session coverage for UE 210. Assume that UE 210 initially is experiencing session coverage (e.g., with BMSC 230 and/or BVPS 240), and that MMW 214 provides, to application 212, a service quality indication 1032 indicating that the service quality for UE 210 is good. Now assume that MMW 214 determines that there is no temporary mobile group identity (TMGI) on a serving band provided by BMSC 230 and/or BVPS 240, as indicated by reference number 1034. MMW 214 may determine that the TMGI is missing for longer than a particular duration (e.g., an out-session-hysteresis), as indicated by reference number 1036. Based on these determinations, MMW 214 may provide, to application 212, a notification 1038 indicating that UE 210 is out of session coverage from BMSC 230 and/or BVPS 240. MMW 214 may also provide, to application 212, a service quality indication 1040 indicating that the service quality for UE 210 is bad.

As further shown in FIG. 10, service quality and coverage for UE 210 may include a third case scenario 1050 associated with out of eMBMS service coverage for UE 210. Assume that UE 210 initially is experiencing eMBMS service coverage (e.g., with BMSC 230 and/or BVPS 240), and that MMW 214 provides, to application 212, a service quality indication 1052 indicating that the service quality for UE 210 is good. Now assume that MMW 214 determines that there is no eMBMS system information block (SIB) message on the serving band provided by BMSC 230 and/or BVPS 240, as indicated by reference number 1054. MMW 214 may determine that UE 210 is missing eMBMS service for longer than a particular duration (e.g., an out-MBMS-hysteresis), as indicated by reference number 1056. Based on these determinations, MMW 214 may provide, to application 212, a notification 1058 indicating that UE 210 is out of eMBMS service coverage from BMSC 230 and/or BVPS 240. MMW 214 may also provide, to application 212, a service quality indication 1060 indicating that the service quality for UE 210 is bad.

In some implementations, due to UE 210 mobility, multiple application notifications may be generated concurrently by MMW 214. For example, if UE 210 is moving out of eMBMS coverage while utilizing a service session, two notifications (e.g., a session unavailable notification and an out of eMBMS service area notification) may be generated by MMW 214 at the same time. In some implementations, MMW 214 may provide, to application 212, a higher priority notification and may discard lower priority notification(s). In some implementations, MMW 214 may assign a highest priority to an out of eMBMS service coverage notification, a next highest priority to a service session unavailable notification, and a lowest priority to a bad service presentation notification. In some implementations, MMW 215 may assign different priorities to notifications or may not assign any priorities to notifications.

As indicated above, FIG. 10 is provided merely as an example. Other examples are possible and may differ from what was described with regard to FIG. 10.

FIG. 11 is a diagram of an example call flow 1100 relating to single band eMBMS for a UE. As shown, application 212 may generate a start eMBMS service request or MMW 214 may wake up, as indicated by reference number 1105. Based on the start eMBMS service request or waking up, MMW 214 may set a timer for acquiring a service announcement (SA) and a TMGI associated with BMSC 230 and/or BVPS 240, as indicated by reference number 1110. As further shown in FIG. 11, MMW 214 may determine that a current serving frequency band is not carrying eMBMS, but that another serving frequency band is carrying eMBMS, as indicated by reference number 1115. If UE 210 is in a connected mode, MMW 214 may request a handover to another serving frequency band, as further indicated by reference number 1115. If UE 210 is in an idle mode, MMW 214 may utilize eMBMS frequency prioritization for cell reselection.

MMW 214 may wait for a serving frequency band switch for a particular time period, as indicated by reference number 1120. In some implementations, if the particular time period expires, MMW 214 may determine that a notification, associated with the eMBMS service, is to be provided to application 212, as further indicated by reference number 1120. In such implementations, MMW 214 may provide, to application 212, a start eMBMS service response 1125 (e.g., indicating a failure) and a notification 1130 indicating that UE 210 is outside of eMBMS service coverage.

In some implementations, if the particular time period does not expire, MMW 214 may continue trying to establish the eMBMS service, as indicated by reference number 1135. MMW 214 may switch to a serving frequency band carrying the eMBMS service, as indicated by reference number 1140, and may stop the timer, as indicated by reference number 1145. MMW 214 may acquire the SA and the TMGI for the eMBMS service from BMSC 230 and/or BVPS 240, as indicated by reference number 1150. In such implementations, MMW 214 may provide, to application 212, a start eMBMS service response 1155 (e.g., indicating a success) and a service update 1160 that includes information associated with the eMBMS service (e.g., a service identifier, a name, a schedule, MPD URLs, availability, etc.).

As indicated above, FIG. 11 is provided merely as an example. Other examples are possible and may differ from what was described with regard to FIG. 11.

FIG. 12 is a diagram of an example call flow 1200 relating to eMBMS priority for a UE. As shown, UE 210 (e.g., application 212) may be utilizing an eMBMS session, and UE 210 may receive an incoming call, as indicated by reference number 1205. MMW 214 may determine that a FEC failure rate for the eMBMS session is below a threshold, as indicated by reference number 1210. Based on this determination, MMW 214 may provide, to application 212, a service quality indication 1215 indicating that the service quality for UE 210 is good.

As further shown in FIG. 12, application 212 may accept the call and may push the eMBMS session to the background, as indicated by reference number 1220. Application 212 may instruct MMW 214 to set a priority for the eMBMS session to low, as indicated by reference number 1225, and MMW 214 may set the priority for the eMBMS session to unicast based on the instructions, as indicated by reference number 1230. MMW 214 may provide an eMBMS interest indication message (e.g., indicating a low and unicast priority for the eMBMS session) to BMSC 230 and/or BVPS 240, as indicated by reference number 1235. MMW 214 may provide, to application 212, an acknowledgement 1240 of setting the priority for the eMBMS session to low and unicast.

As further shown in FIG. 12, BMSC 230 and/or BVPS 240 may conduct a network policy to prioritize the call for UE 210, as indicated by reference number 1245. MMW 214 may receive source and repair packets for the eMBMS session (e.g., from BMSC 230 and/or BVPS 240), and may reassemble source blocks for the eMBMS session with the packets, as indicated by reference number 1250. MMW 214 may determine that the FEC failure rate for the eMBMS session is above the threshold, as indicated by reference number 1255. Based on this determination, MMW 214 may provide, to application 212, a service quality indication 1260 indicating that the service quality for UE 210 is good or bad.

As indicated above, FIG. 12 is provided merely as an example. Other examples are possible and may differ from what was described with regard to FIG. 12.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   providing, by a first device and to a second device, a start request for an evolved multimedia broadcast multicast services (eMBMS) session;
   receiving, by the first device, eMBMS session traffic from the second device based on the start request;
   determining, by the first device, track information associated with the eMBMS session traffic;
   decoding, by the first device, the eMBMS session traffic into a format understood by the first device;
   determining, by the first device, quality information associated with the eMBMS session traffic,
      where determining the quality information includes:
         determining a service quality indication based on a failure rate associated with the eMBMS session traffic,
            the service quality indication indicating a first service quality, associated with the eMBMS session traffic, when the failure rate satisfies a particular threshold, and
            the service quality indication indicating a second service quality, associated with the eMBMS session traffic, when the failure rate fails to satisfy the particular threshold; and
   presenting, by the first device and for display, the decoded eMBMS session traffic, the track information, and the quality information associated with the eMBMS session traffic.

2. The method of claim 1, further comprising:
   generating a stop request for the eMBMS session;
   stopping receipt of the eMBMS session traffic from the second device based on the stop request; and
   stopping determination of the quality information associated with the eMBMS session traffic based on the stop request.

3. The method of claim 1, where, prior to providing the start request for the eMBMS session to the second device, the method further comprises:
   executing an eMBMS application provided on the first device;
   generating a registration request for the eMBMS application based on execution of the eMBMS application;
   verifying an authentication of the eMBMS application based on the registration request; and
   registering the eMBMS application when the authentication of the eMBMS application is verified.

4. The method of claim 3, where providing the start request for the eMBMS session to the second device comprises:
   providing a request to start a multicast service to the second device;
   presenting, for display, a service announcement associated with the multicast service and a current location of the first device; and
   utilizing the eMBMS application to provide the start request for the eMBMS session to the second device.

5. The method of claim 1, where the eMBMS session traffic includes live streaming content provided by the second device.

6. A device, comprising:
   one or more memory devices to store an application, multicast middleware, and a media player; and
   one or more processors to:
      cause the application to:
         generate a start request for an evolved multimedia broadcast multicast services (eMBMS) session, and
         provide the start request to the multicast middleware;
      cause the multicast middleware to:
         establish the eMBMS session with another device based on the start request,
         receive eMBMS session traffic, from the other device, via the eMBMS session and based on the start request,
         decode the eMBMS session traffic into a format understood by the device,
         determine quality information associated with the eMBMS session traffic,
            the quality information including a service quality indication based on a failure rate associated with the eMBMS session traffic,
               the service quality indication indicating a first service quality, associated with the eMBMS session traffic, when the failure rate satisfies a particular threshold, and
               the service quality indication indicating a second service quality, associated with the eMBMS session traffic, when the failure rate fails to satisfy the particular threshold;
         provide the decoded eMBMS session traffic and the quality information associated with the eMBMS session traffic to the media player; and
      cause the media player to:
         present, for display, the decoded eMBMS session traffic and the quality information associated with the eMBMS session traffic.

7. The device of claim 6, where the one or more processors are further to:
   cause the application to:
      generate a stop request for the eMBMS session, and
      provide the stop request to the multicast middleware; and
   cause the multicast middleware to:
      stop receiving the eMBMS session traffic from the other device based on the stop request, and
      stop determining the quality information associated with the eMBMS session traffic based on the stop request.

8. The device of claim 6, where, prior to generating the start request for the eMBMS session, the one or more processors are further to:
cause the application to:
initialize the multicast middleware,
generate a registration request for the application, and
provide the registration request to the multicast middleware; and
cause the multicast middleware to:
verify an authentication of the application based on the registration request, and
register the application when the authentication of the application is verified.

9. The device of claim 6, where the application and the multicast middleware communicate via an application programming interface (API).

10. The device of claim 6, where the eMBMS session traffic includes live streaming content provided by the other device.

11. A method, comprising:
providing, by a first device and to a second device, a start request for an evolved multimedia broadcast multicast services (eMBMS) file download;
setting, by the first device, a timer for the eMBMS file download based on the start request;
establishing, by the first device, an eMBMS session with the second device based on the start request;
receiving, by the first device and via the eMBMS session, the file from the second device, based on the start request and the setting of the timer;
decoding, by the first device, the file into a format understood by the first device;
determining, by the first device, quality information associated with the eMBMS session,
the quality information including a service quality indication based on a failure rate associated with the eMBMS session,
the service quality indication indicating a first service quality, associated with the eMBMS session, when the failure rate satisfies a particular threshold, and
the service quality indication indicating a second service quality, associated with the eMBMS session, when the failure rate fails to satisfy the particular threshold;
repairing, by the first device, the decoded file to replace missing information in the file; and
storing, by the first device, the decoded and repaired file and the quality information.

12. The method of claim 11, further comprising:
generating a notification associated with the eMBMS file download; and
presenting, for display, the notification associated with the eMBMS file download.

13. The method of claim 11, where, prior to providing the start request for the eMBMS file download to the other device, the method further comprises:
executing an eMBMS application provided on the first device;
generating a registration request for the eMBMS application based on execution of the eMBMS application;
verifying an authentication of the eMBMS application based on the registration request; and
registering the eMBMS application when the authentication of the eMBMS application is verified.

14. The method of claim 13, where providing the start request for the eMBMS file download to the other device comprises:
providing a request to start a multicast service to the second device;
presenting, for display, a service announcement associated with the multicast service and a current location of the first device; and
utilizing the eMBMS application to provide the start request for the eMBMS file download to the second device.

15. The method of claim 11, where the file includes content provided by the second device.

16. A device, comprising:
one or more memory devices to store an application and multicast middleware; and
one or more processors to:
cause the application to:
generate a start request for an evolved multimedia broadcast multicast services (eMBMS) file download, and
provide the start request to the multicast middleware; and
cause the multicast middleware to:
set a timer for the eMBMS file download based on the start request,
establish an eMBMS session with another device based on the start request,
receive, via the eMBMS session, the file from the other device, based on the start request and the setting of the timer,
decode the file into a format understood by the device,
determine quality information associated with the eMBMS session,
the quality information including a service quality indication based on a failure rate associated with the eMBMS session,
the service quality indication indicating a first service quality, associated with the eMBMS session, when the failure rate satisfies a particular threshold, and
the service quality indication indicating a second service quality, associated with the eMBMS session, when the failure rate fails to satisfy the particular threshold, and
store the decoded file and the quality information.

17. The device of claim 16, where the one or more processors are further to:
cause the multicast middleware to:
generate a notification associated with the eMBMS file download, and
provide the notification to the application; and
cause the application to:
present, for display, the notification associated with the eMBMS file download.

18. The device of claim 16, where, prior to generating the start request for the eMBMS file download, the one or more processors are further to:
cause the application to:
initialize the multicast middleware,
generate a registration request for the application, and
provide the registration request to the multicast middleware; and
cause the multicast middleware to:
verify an authentication of the application based on the registration request, and
register the application when the authentication of the application is verified.

19. The device of claim 16, where the application and the multicast middleware communicate via an application programming interface (API).

20. The device of claim 16, where the file includes content provided by the other device.

* * * * *